(12) United States Patent
Deotale et al.

(10) Patent No.: US 10,936,170 B2
(45) Date of Patent: Mar. 2, 2021

(54) METHOD FOR ENABLING INTERACTION USING FINGERPRINT ON DISPLAY AND ELECTRONIC DEVICE THEREOF

(71) Applicant: SAMSUNG ELECTRONICS CO., LTD., Suwon-si (KR)

(72) Inventors: Gunjan Prakash Deotale, Bengaluru (IN); Samarth Shankar Raut, Satara (IN); Jidnya Samir Shah, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 57 days.

(21) Appl. No.: 16/131,774

(22) Filed: Sep. 14, 2018

(65) Prior Publication Data

US 2019/0095079 A1    Mar. 28, 2019

(30) Foreign Application Priority Data

Sep. 14, 2017  (IN) .............................. 201741032625
Sep. 11, 2018  (IN) .............................. 201741032625

(51) Int. Cl.
*G06F 21/32*      (2013.01)
*G06F 3/0484*    (2013.01)
*G06F 3/0488*    (2013.01)
*G06K 9/00*       (2006.01)
*G06F 3/0482*    (2013.01)

(52) U.S. Cl.
CPC ........ *G06F 3/04842* (2013.01); *G06F 3/0482* (2013.01); *G06F 3/0488* (2013.01); *G06F 3/04845* (2013.01); *G06F 3/04886* (2013.01); *G06K 9/0002* (2013.01); *G06K 9/0004* (2013.01); *G06F 2203/0338* (2013.01);

(Continued)

(58) Field of Classification Search
CPC .............. G06F 3/04842; G06F 3/0482; G06F 3/04845; G06F 3/0488; G06F 3/04886; G06F 2203/0338; G06F 2203/04806; G06F 2203/04808; G06K 9/0004; G06K 9/0002
USPC ......................................... 715/748
See application file for complete search history.

(56) References Cited

U.S. PATENT DOCUMENTS 10,116,868 B2   10/2018  Wyrwas et al.
10,152,625 B2   12/2018  Han et al.
(Continued)

FOREIGN PATENT DOCUMENTS

CN    106233295 A    12/2016
CN    105264536 B    3/2017
(Continued)

OTHER PUBLICATIONS

International Search Report (PCT/ISA/210) dated Dec. 20, 2018, issued by the International Searching Authority in counterpart International Application No. PCT/KR2018/010842.

(Continued)

*Primary Examiner* — Hassan Mrabi
(74) *Attorney, Agent, or Firm* — Sughrue Mion, PLLC

(57) ABSTRACT

A method for enabling interaction on an electronic device using fingerprint on display to execute an operation of the electronic device based on the detected fingerprint. The method may includes detecting at least one fingerprint from at least one touch input on a display screen, identifying an object corresponding to the at least one fingerprint, and performing at least one actions based on the object.

16 Claims, 23 Drawing Sheets

(52) U.S. Cl.
CPC .............. *G06F 2203/04806* (2013.01); *G06F 2203/04808* (2013.01)

(56) References Cited

U.S. PATENT DOCUMENTS

| | | | |
|---|---|---|---|
| 2011/0037727 A1* | 2/2011 | Lee | G06F 3/0416 345/174 |
| 2011/0273267 A1* | 11/2011 | Bong | G06F 3/016 340/5.53 |
| 2013/0324089 A1* | 12/2013 | Kim | G06F 21/32 455/411 |
| 2015/0133084 A1* | 5/2015 | Baek | G06F 3/048 455/411 |
| 2015/0256905 A1* | 9/2015 | Lee | H04N 21/233 725/18 |
| 2015/0269409 A1 | 9/2015 | Weber | |
| 2015/0286873 A1* | 10/2015 | Davis | G06F 3/013 382/103 |
| 2016/0011767 A1* | 1/2016 | Jung | G06F 3/0488 715/847 |
| 2016/0182707 A1* | 6/2016 | Gabel | H04W 4/90 455/404.2 |
| 2016/0196466 A1 | 7/2016 | Jiang et al. | |
| 2016/0321494 A1* | 11/2016 | Shin | G06K 9/00013 |
| 2017/0249919 A1* | 8/2017 | Bae | H04N 21/4858 |
| 2017/0255269 A1* | 9/2017 | Yang | G06F 3/016 |
| 2018/0137327 A1* | 5/2018 | Riedijk | G06K 9/00067 |
| 2018/0260602 A1* | 9/2018 | He | G06K 9/0008 |
| 2018/0349588 A1* | 12/2018 | Abdelmoneum | G06F 21/32 |

FOREIGN PATENT DOCUMENTS

| | | |
|---|---|---|
| KR | 10-2014-0066003 A | 7/2014 |
| KR | 10-2015-0087667 A | 7/2015 |
| KR | 10-2017-0021514 A | 2/2017 |
| KR | 10-2017-0029757 A | 3/2017 |
| WO | 01/11550 A1 | 2/2001 |
| WO | 2014/004210 A1 | 1/2014 |
| WO | 2015/119324 A1 | 8/2015 |

OTHER PUBLICATIONS

Written Opinion (PCT/ISA/237) dated Dec. 20, 2018, issued by the International Searching Authority in counterpart International Application No. PCT/KR2018/010842.
Communication dated Jul. 16, 2020, issued by the European Patent Office in counterpart European Application No. 18855828.2.
Communication dated Jul. 10, 2020, from the Intellectual Property Office of India in Indian Application No. 201741032625.

* cited by examiner

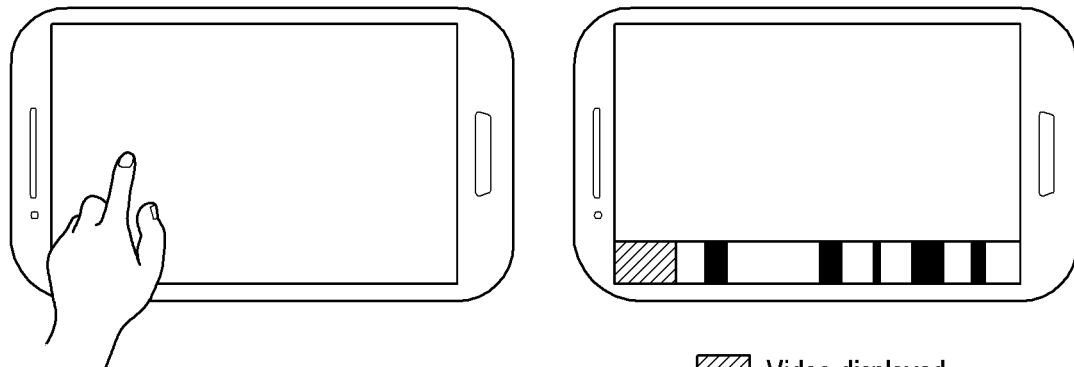
FIG.8A
Video displayed
Content skipped
Content yet to be displayed
FIG.8B
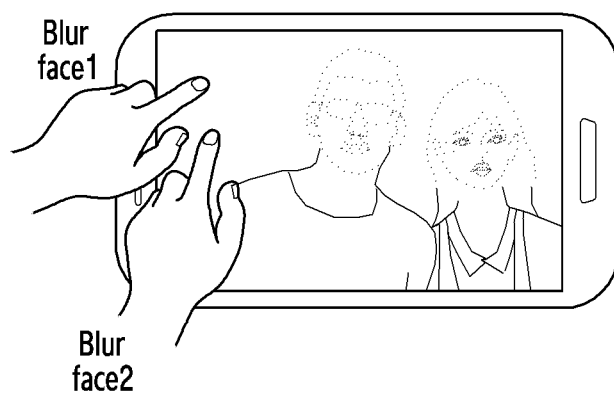
Blur face1
Blur face2
FIG.8C
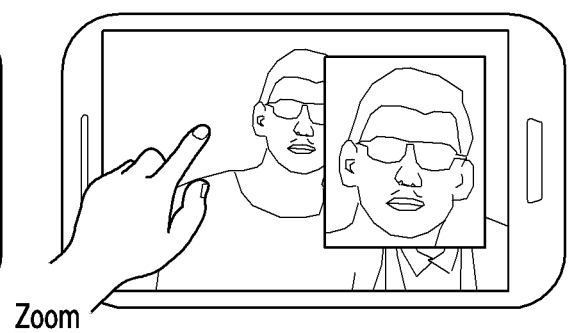
Zoom face1
FIG.8D

METHOD FOR ENABLING INTERACTION USING FINGERPRINT ON DISPLAY AND ELECTRONIC DEVICE THEREOF

CROSS-REFERENCE TO RELATED APPLICATION(S)

This application is based on and claims priority under 35 U.S.C. § 119 from an Indian Patent Application Number 201741032625 filed on Sep. 14, 2017, and Indian Patent Application Number 201741032625 filed on Sep. 11, 2018, in the India Patent Office, the disclosures of which are incorporated by reference in their entireties.

BACKGROUND

1. Field

The disclosure relates to electronic devices, and more particularly a method and electronic device for enabling interaction using a fingerprint on display.

2. Description of Related Art

Generally, ubiquitous input devices like fingerprint on display (FOD) provide an interactive and fast way for a user of the electronic device to interact with applications by the help of gestures (such as for e.g., touch input, long press, etc.). As the electronic devices, such as smartphone of the user, are prone to be accessed by one or more different users with or without the user's knowledge, a demand for providing security to the electronic devices and/or the applications installed therein is increased.

The use of a fingerprint integrated with display is an emerging trend, in which a fingerprint sensor is placed underneath a touchscreen for ensuring secure interaction with the device. Using a fingerprint integrated display, various kinds of applications, especially applications based on fingerprint information, have been gradually popularized. In this context, there remains a need to define various mechanisms for interacting with an electronic device using the fingerprint information of the user.

SUMMARY

In accordance with aspects of the disclosure, there is provided a method and electronic device for enabling interaction using a fingerprint on display.

In accordance with an aspect of the disclosure, one or more fingerprints may be registered with one or more graphical objects.

In accordance with an aspect of the disclosure, the one or more fingerprints may be received on a display screen of the electronic device for interacting with the one or more graphical objects.

In accordance with an aspect of the disclosure, an action may be dynamically performed in the electronic device using the one or more fingerprints.

In accordance with an aspect of the disclosure, one or more fingerprints may be assigned to the one or more graphical objects.

In accordance with an aspect of the disclosure, the one or more fingerprints assigned to the one or more graphical objects may be stored.

In accordance with an aspect of the disclosure, one or more recommendations for registering the one or more fingerprints with one or more graphical objects may be provided based on content associated with the one or more graphical objects.

In accordance with an aspect of the disclosure, the one or more graphical objects assigned to the one or more fingerprints may be identified.

In accordance with an aspect of the disclosure, an action may be performed in the electronic device using the one or more fingerprints.

In accordance with an aspect of the disclosure, one or more graphical objects assigned to the one or more fingerprints may be displayed in response to detecting the one or more fingerprints.

In accordance with an aspect of the disclosure, there is provided a method for enabling interaction on an electronic device using fingerprint on display. The method may include registering one or more fingerprints with one or more graphical objects, detecting the one or more fingerprints on a display screen of the electronic device for interacting with the one or more graphical objects and dynamically performing an action in the electronic device using the one or more fingerprints.

In accordance with an aspect of the disclosure, registering the one or more fingerprints with one or more graphical objects may include receiving one or more fingerprints for the one or more graphical objects. The method may include assigning the received one or more fingerprints to the one or more graphical objects and storing the one or more fingerprints assigned to the one or more graphical objects.

In accordance with an aspect of the disclosure, the electronic device may provide one or more recommendations for registering the one or more fingerprints with one or more graphical objects based on content associated with the one or more graphical objects.

In accordance with an aspect of the disclosure, dynamically performing an action in the electronic device using the one or more fingerprints may include receiving one or more fingerprints on a display screen of the electronic device. The method may include identifying the one or more graphical objects assigned to the one or more fingerprints and performing an action in the electronic device using the one or more fingerprints.

In accordance with an aspect of the disclosure, performing an action in the electronic device using the one or more fingerprints may include displaying one or more graphical objects assigned to the one or more fingerprints.

In accordance with an aspect of the disclosure, performing an action in the electronic device using the one or more fingerprints may include extracting content relevant to the one or more graphical objects. The method may include rendering the extracted content.

In accordance with an aspect of the disclosure, the method may include performing one or more actions using one or more fingerprints received on the display screen when the extracted content is being rendered.

In accordance with an aspect of the disclosure, performing an action in the electronic device using the one or more fingerprints may include selecting at least one content in the electronic device using the one or more fingerprints. The method may include transferring the selected content to another electronic device using the one or more fingerprints.

In accordance with an aspect of the disclosure, performing an action in the electronic device using the one or more fingerprints may include selecting one or more graphical objects in the electronic device using the one or more fingerprints. The method may include accessing the selected one or more graphical objects with the one or more fingerprints.

In accordance with an aspect of the disclosure, performing an action in the electronic device using the one or more fingerprints may include modifying one or more the parameters of the graphical objects.

In accordance with an aspect of the disclosure, there is provided an electronic device for enabling interaction using fingerprint on display. The electronic device may include a registration engine and an interaction engine. The registration engine may be configured to register one or more fingerprints with one or more graphical objects. The interaction engine may be configured to receive the one or more fingerprints on a display screen of the electronic device for interacting with the one or more graphical objects. Further, the interaction engine may be configured to dynamically perform an action in the electronic device using the one or more fingerprints.

In accordance with an aspect of the disclosure, there is provided a method for operating an electronic device. The method may includes detecting at least one fingerprint from at least one touch input on a display screen, identifying an object corresponding to the at least one fingerprint, and performing at least one actions based on the object.

In accordance with an aspect of the disclosure, there is provided a method for operating an electronic device. The method may include detecting a fingerprint of a finger corresponding to a touch input on a display screen, determining an operation of the electronic device corresponding to the fingerprint, and performing the operation of the electronic device.

These and other aspects of the disclosure will be better appreciated and understood when considered in conjunction with the following description and the accompanying drawings. It should be understood, however, that the following descriptions, while describing embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Certain aspects of the disclosure are illustrated in the accompanying drawings, throughout which like reference letters indicate corresponding parts in the various figures. The embodiments herein will be better understood from the following description with reference to the drawings, in which:

FIGS. 8A, 8B, 8C, and 8D illustrate examples in which various actions are performed on the multimedia content using the fingerprint on display of the electronic device, according to an embodiment;

DETAILED DESCRIPTION OF EMBODIMENTS

Figure 1A:
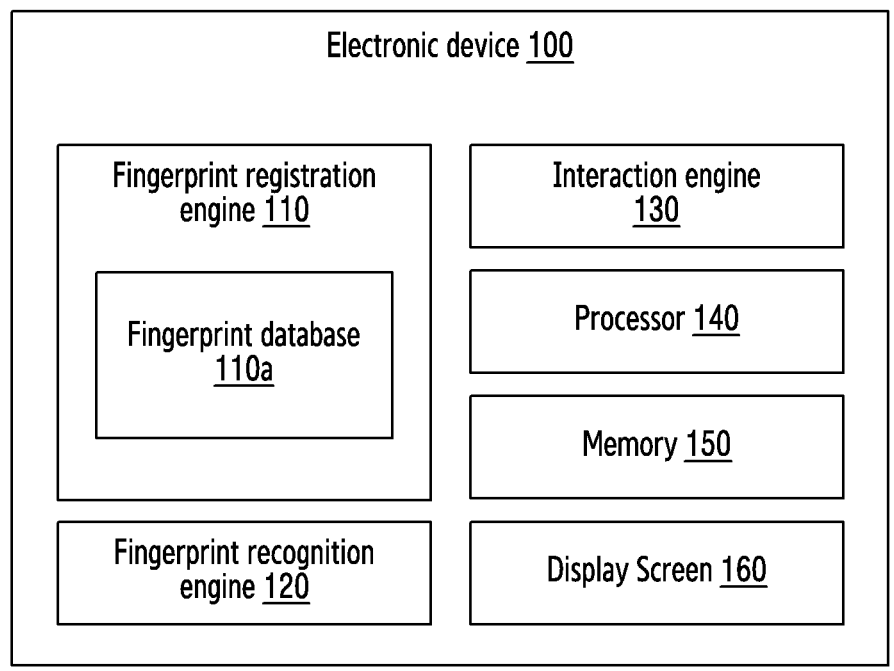
FIG. 1A is a block diagram of an electronic device, according to an embodiment.

Various embodiments of the disclosure will now be described in detail with reference to the accompanying drawings. In the following description, specific details such as detailed configuration and components are provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Also, the various embodiments described herein are not necessarily mutually exclusive, as some embodiments can be combined with one or more other embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors executing computer-readable instructions, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be combined into more complex blocks without departing from the scope of the disclosure.

The embodiments herein generally provide for a method for enabling interaction on an electronic device using a fingerprint on a display. The method may include registering one or more fingerprints with one or more graphical objects. The method may include receiving the one or more fingerprints on a display screen of the electronic device for interacting with the one or more graphical objects. Further, the method may include dynamically performing an action in the electronic device using the one or more fingerprints.

The proposed method can be used for interacting with the electronic device using the fingerprint on display. With the proposed method, various fingerprints can be assigned to various graphical objects and those graphical objects can be retrieved, accessed, and/or controlled using the fingerprints on the display.

In some embodiments, the method may include detecting the fingerprint on the display and modifying various parameters (e.g.: appearance, zoom, scenes, audio mute, language) of the graphical objects.

In various embodiments, the method may include providing various recommendations for assigning the various fingerprints to the graphical objects.

Referring now to the drawings, and more particularly to FIGS. 1A through 13, in which similar reference characters denote corresponding features consistently throughout the figures, there are described various embodiments.

FIG. 1A is a block diagram of an electronic device 100, according to an embodiment. As illustrated in the FIG. 1A, the electronic device 100 includes a fingerprint registration engine 110, a fingerprint recognition engine 120, an interaction engine 130, a processor 140, a memory 150 and a display screen 160.

In an embodiment, fingerprint registration engine 110 can be configured to register the fingerprints of various fingers of the user, and associate the fingerprints with objects. Herein, the objects may include contents, functions, information, graphical items (icons, graphics, etc.), application components, or any combination thereof. For example, a fingerprint of the thumb is registered with a first object, a fingerprint of the index finger is registered with a second object, and a fingerprint of the middle finger is registered with a third object. More than one object may be registered with a same fingerprint.

The fingerprint registration engine 110 can be configured to detect the fingerprints of the various fingers in the user's hand and register these fingerprints of the various fingers in association with one or more objects. The fingerprint registration engine 110 can implement various conventional mechanisms for obtaining various fingerprints of the fingers in the user's hand. The fingerprint registration engine 110 can include one or more sensors and other components for obtaining the fingerprints of the user. The fingerprint registration engine 110 can be configured to store the one or more fingerprints detected from the user in a fingerprint database 110a. The various steps performed by the fingerprint registration engine are described in FIG. 1B.

The fingerprint recognition engine 120 can be configured to recognize the detected one or more fingerprints of the user. In some embodiments, the fingerprint recognition engine 120 can be configured to identify the objects associated with the one or more fingerprints of the user.

In an embodiment, the interaction engine 130 can be configured to perform one or more actions in the electronic device 100 by identifying the objects assigned to the one or more fingerprints based on the fingerprints detected on the display screen 160. The various actions performed by the interaction engine 130 based on the fingerprints detected on the display screen 160 are explained in conjunction with the figures in the later parts of the description.

The processor 140 is coupled with the interaction engine 130 and the memory 150. The processor 140 is configured to execute instructions stored in the memory 150 and to perform various actions for providing the context based multimodal predictions. The memory 150 also stores instructions to be executed by the processor 140. The memory 150 may include non-volatile storage elements. Although the fingerprint database 110a is illustrated as being a component of the fingerprint registration engine, the fingerprint database 110 may be stored in the memory 150 and accessed by the fingerprint registration engine 110.

The display screen 160 in combination with one or more other components of the electronic device 100, such as the fingerprint registration engine 110, the fingerprint recognition engine 120 and the processor 140, can be configured to detect fingerprints and to display the objects. Further, the display screen 160 can be configured to display UI changes based on the detected fingerprints of the user.

Although the FIG. 1A shows various hardware components of the electronic device 100, it is to be understood that other embodiments are not limited thereon. In other embodiments, the electronic device 100 may include fewer or more components. Further, the labels or names of the components are used only for illustrative purpose and do not limit the scope of the invention. One or more components can be combined together to perform same or substantially similar function to perform actions in the electronic device 100.

Figure 1B:
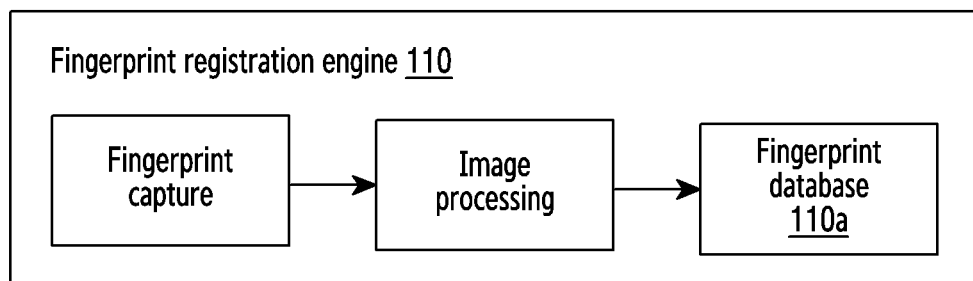
FIG. 1B illustrates various steps performed by a fingerprint registration engine, according to an embodiment.

FIG. 1B illustrates various steps performed by a fingerprint registration engine 110, according to an embodiment. The fingerprint registration engine 110 captures fingerprints of the various fingers. Further, the fingerprint registration engine 110 processes the images corresponding to the fingerprints of the various fingers to uniquely identify the various fingerprints of the user. In some embodiments, fingerprint registration engine 110 can be configured to detect the fingerprints of the various fingers in the user's hand and register these fingerprints of the various fingers with one or more objects. The fingerprint registration engine 110 can be configured to associate the registration of the fingerprints with the one or more objects in the fingerprints database 110a.

Figure 1C:
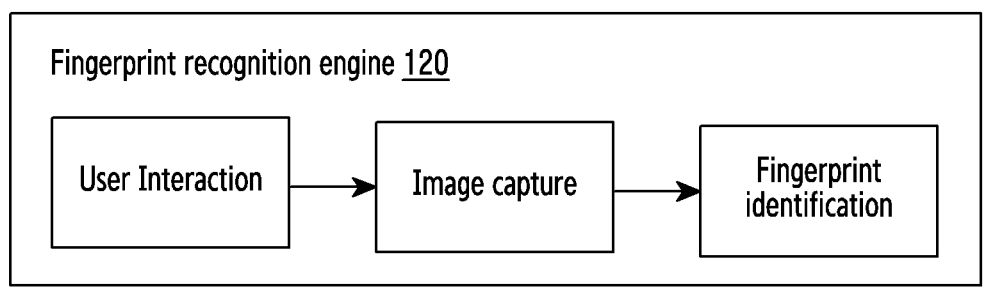
FIG. 1C illustrates various steps performed by a fingerprint recognition engine, according to an embodiment.

FIG. 1C illustrates various steps performed by a fingerprint recognition engine 120, according to an embodiment. In an embodiment, the fingerprint recognition engine 120 can be configured to identify various user interactions through the fingerprints. The fingerprint recognition engine 120 captures images of the fingerprints to identify the fingerprints of the user. Further, the fingerprint recognition engine 120 determines whether there exists any objects assigned to the detected fingerprints. Thus, the fingerprint recognition engine 120 identifies the objects assigned to the one or more fingerprints by checking the fingerprint database 110.

Figure 1D:
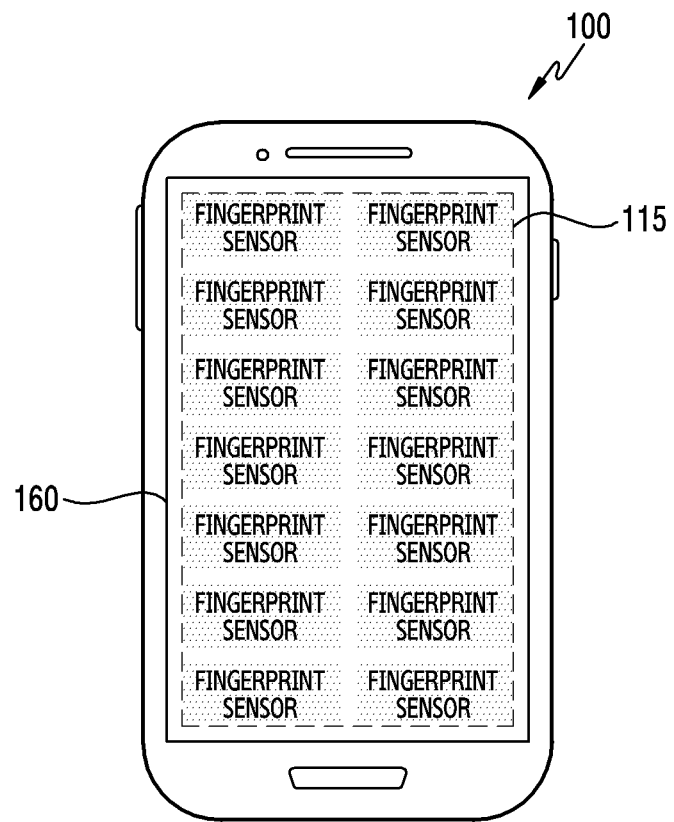
FIG. 1D illustrates installation examples of fingerprint sensors according to an embodiment.

FIG. 1D illustrates installation examples of fingerprint sensors according to an embodiment. Referring to FIG. 1D, a plurality of fingerprint sensors 115 may be installed over the entire panel of the display screen 160. That is, the plurality of fingerprint sensors 115 may be installed in a form in which a plurality of sensing elements are arranged. Accordingly, fingerprint recognition may be performed through the entire region of the display screen 160. In this regard, the plurality of fingerprint sensors 115 may be regarded as a single fingerprint sensor disposed across the entirety of the panel of the display screen 160. Since the plurality of fingerprint sensors 115 is located in the entire region of the panel of the display screen 160 rather than the partial region thereof, a fingerprint can be input anywhere in a user's desired region of the panel of the display screen 160, thereby enhancing the user experience.

Figure 2:
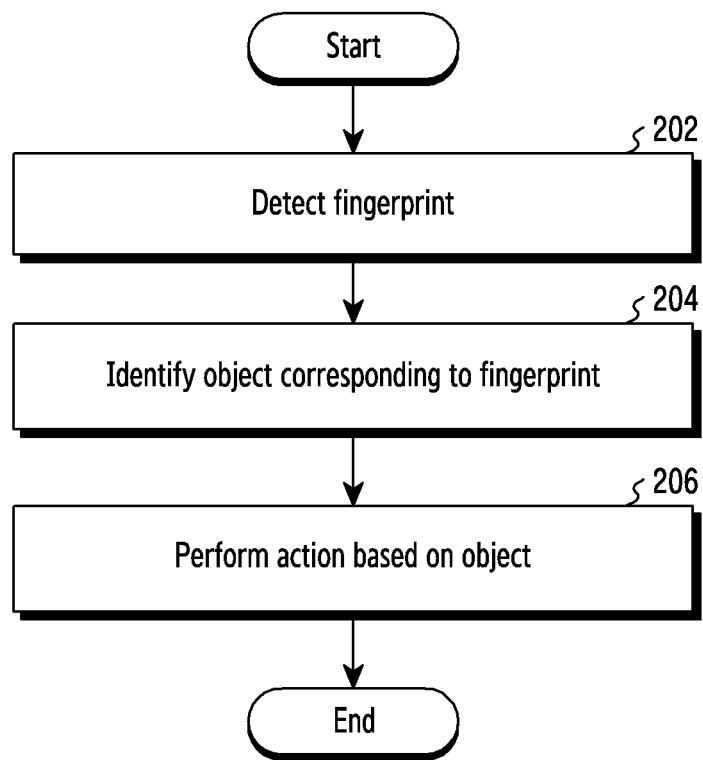
FIG. 2 is a flow chart illustrating a method for enabling interaction using a fingerprint, according to an embodiment.

FIG. 2 is a flow chart illustrating a method for enabling interaction using fingerprint, according to an embodiment.

Referring to FIG. 2, at step 202, the electronic device 100 detects at least one fingerprint. In response to at least one touch input being detected on the display screen 160, the electronic device 100 detects the at least one fingerprint using at least one fingerprint sensor.

At step 204, the electronic device 100 identifies an object corresponding to the fingerprint. Specifically, the electronic device 100 identifies the fingerprint by matching a captured fingerprint to one of registered fingerprints, and retrieves the object in a database including mapping information related to objects and fingerprints. The mapping information may be defined for each application. For example, depending on an application, the fingerprints may correspond to graphical objects (e.g. a character, or a component of graphic model), functions (e.g., zoom in/out, or blurring), information (e.g., an identifier), interface items (e.g., virtual keys), states of the electronic device 100 (e.g., lock/unlock, or a mode) and so on.

At step 206, the electronic device 100 performs at least one action based on the object. The electronic device 100 performs at least one action related to the identified object. In various embodiments, the identified object may be used as at least one of a lookup parameter, a command, an address, a classifier and so on. For example, the electronic device 100 may reproduce a portion corresponding to the object in a video, store or transmit data to a destination corresponding to the object, display a user interface (UI) corresponding to the object, transition a mode corresponding to the object, apply a modification corresponding to the object to contents, or perform a function corresponding to the object.

Figure 3A:
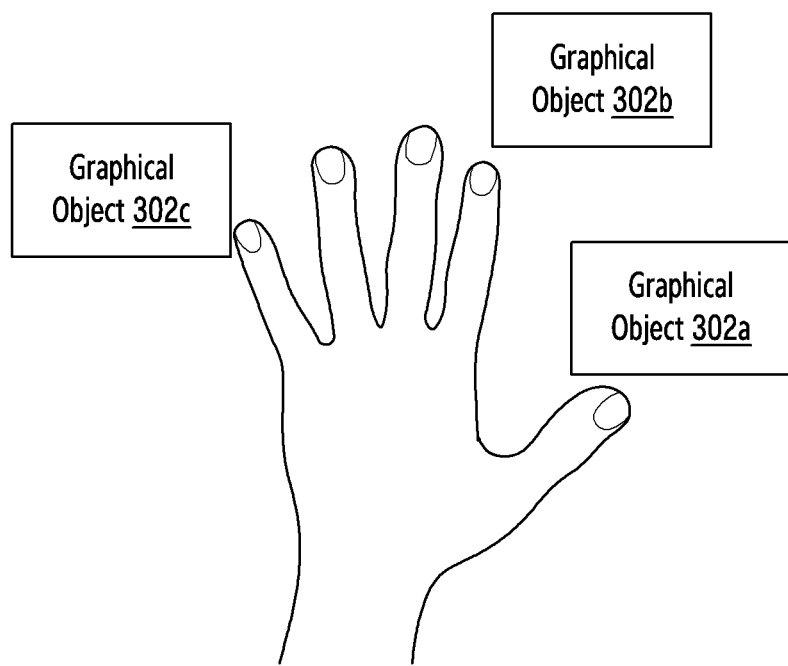
FIGS. 3A, 3B, and 3C illustrate an example for interacting with a multimedia content using a fingerprint on display, according to an embodiment.
Figure 3B:
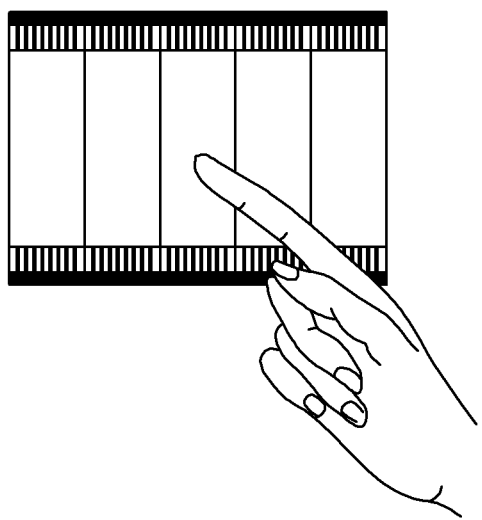
Figure 3C:
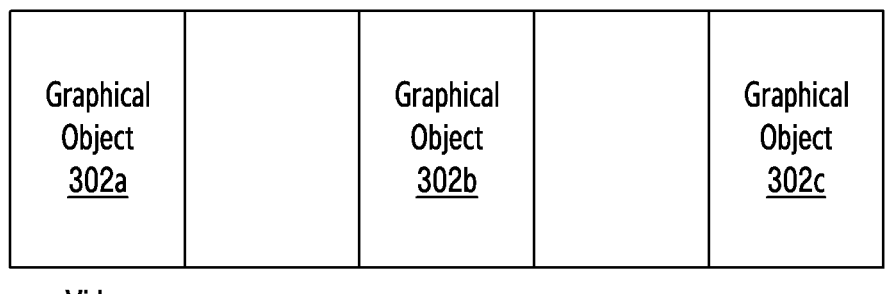

FIGS. 3A-3C are examples for interacting with multimedia content using a fingerprint on display, according to embodiments of the disclosure.

As illustrated in the FIG. 3A, graphical objects 302a, 302b and 302c are assigned to the fingerprints of thumb, index finger and little finger, respectively. The graphical objects 302a, 302b and 302c are associated with the fingerprints of the thumb, the index finger and the little finger. These graphical objects 302a, 302b and 302c can be retrieved or accessed using the fingerprints of the thumb, the index finger and the little finger. In an example, the graphical objects 302a, 302b and 302c can be images, human faces, real world objects, buildings, application icons, labels, buttons, User Interface (UI) elements or the like.

When the graphical objects are considered as human faces, each human face can be assigned to each fingerprint of the thumb, the index finger and the little finger. As illustrated in the FIG. 3B, in order to access the multimedia content having the human face(s), the user performs a tap using the index finger on the multimedia content. When the user taps on the multimedia content using the index finger, the electronic device identifies the presence of the human face (i.e., the graphical object 302b) in the multimedia content. Further, the electronic device renders the content having only the human face (i.e., the graphical object 302b) as shown in the FIG. 3C. Further, when the user performs a tap using the little finger (which is assigned to graphical object 302c), the electronic device renders the content having only the human face (i.e., the graphical object 302c) as shown in the FIG. 3C.

Figure 4A:
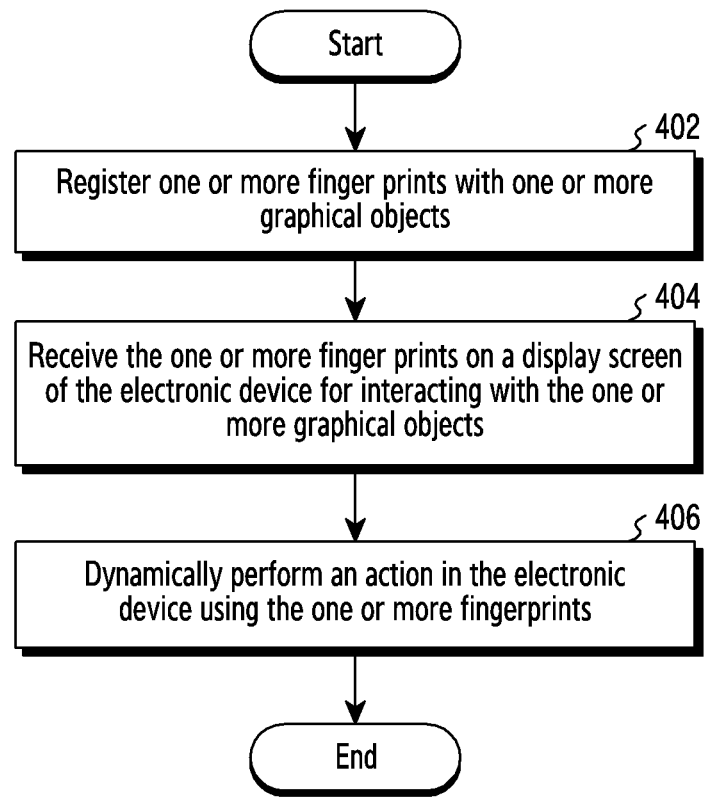
FIG. 4A is a flow chart illustrating a method for interacting with a multimedia content using fingerprint on display, according to an embodiment.

FIG. 4A is a flow chart illustrating a method for interacting with a multimedia content using fingerprint on display, according to an embodiment.

Referring to FIG. 4A, at step 402, the electronic device 100 registers the one or more fingerprints with one or more graphical objects. The fingerprint registration engine 110 registers the one or more fingerprints with one or more graphical objects.

At step 404, the electronic device 100 detects the one or more fingerprints on a display screen 160 for interacting with the one or more graphical objects. The fingerprint recognition engine 120 detects the one or more fingerprints on the display screen 160 of the electronic device 100 for interacting with the one or more graphical objects.

At step 406, the electronic device 100 performs an action using the one or more fingerprints. The interaction engine 130 dynamically performs an action in the electronic device 100 using the one or more fingerprints.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4B:
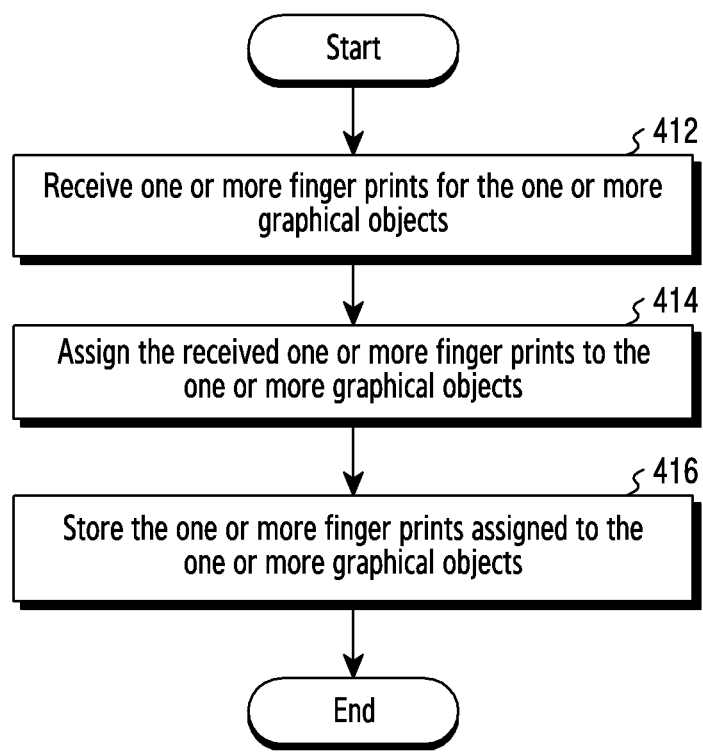
FIG. 4B is a flow chart illustrating a method for registering the fingerprint(s) with graphical object(s), according to an embodiment.

FIG. 4B is a flow chart illustrating a method for registering the fingerprint(s) with graphical object(s), according to an embodiment.

Referring to FIG. 4B, at step 412, the electronic device 100 detects the one or more fingerprints for the one or more graphical objects. The fingerprint registration engine 110 detects the one or more fingerprints for the one or more graphical objects.

At step 414, the electronic device 100 assigns the detected one or more fingerprints to the one or more graphical objects. The fingerprint registration engine 110 assigns the detected one or more fingerprints to the one or more graphical objects.

At step 416, the electronic device 100 stores the one or more fingerprints assigned to the one or more graphical objects. The fingerprint registration engine 110 stores the one or more fingerprints assigned to the one or more graphical objects in the fingerprint database 110a.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

Figure 5A:
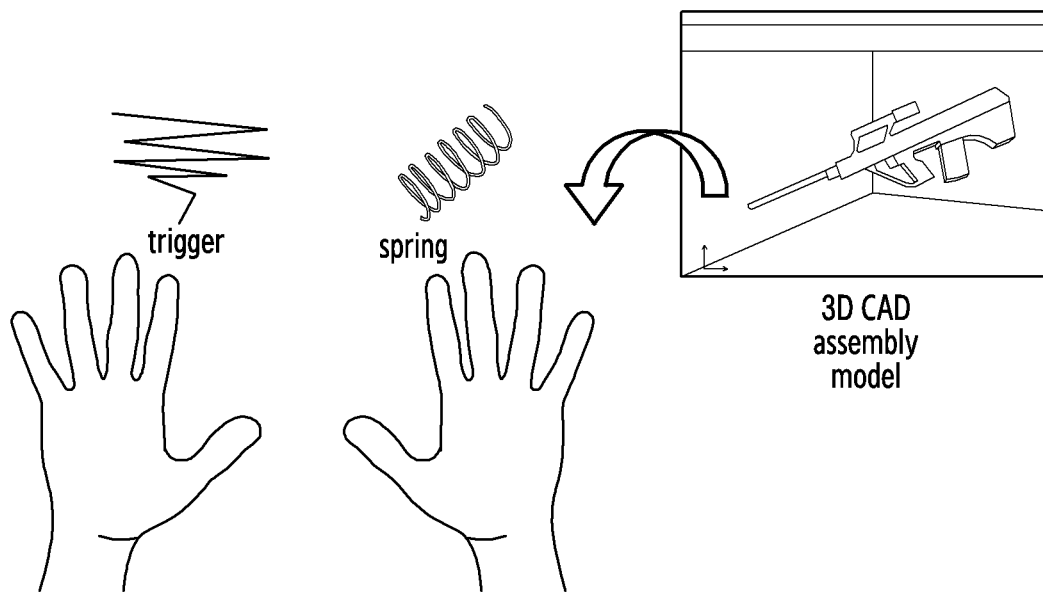
FIGS. 5A, 5B, and 5C illustrate an example in which the electronic device provides interaction with graphical objects using the fingerprint on the display, according to an embodiment.
Figure 5B:
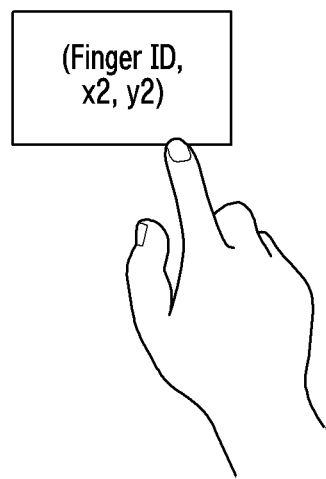
Figure 5C:
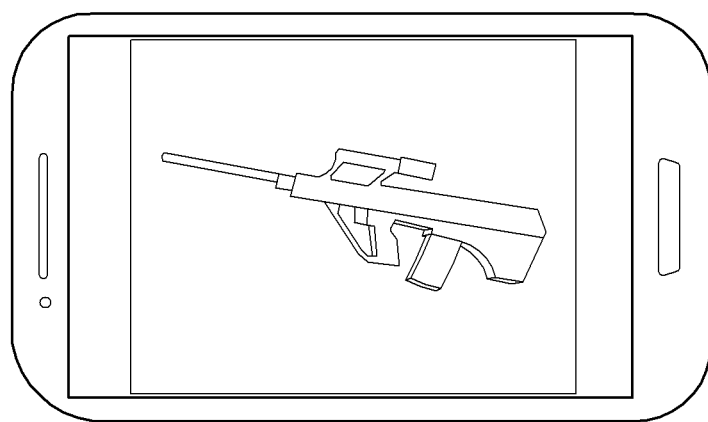

FIGS. 5A-5C illustrate an example in which the electronic device provides interaction with graphical objects using the fingerprint on the display, according to an embodiment.

As illustrated in the FIG. 5A, the user registers fingerprints with each component of a 3D CAD model. The fingerprint of the index finger (of the right hand) is registered with a trigger and the index finger (of the left hand) is registered with a spring. Thus, each fingerprint of each finger is registered with a each component of the 3D CAD model as shown in the FIG. 5A.

As illustrated in the FIG. 5B, the user interacts with the electronic device using the index finger of the right hand. As the index finger is registered with the trigger, the electronic device 100 displays the 3D CAD model by highlighting the trigger as shown in the FIG. 5C.

Figure 6:
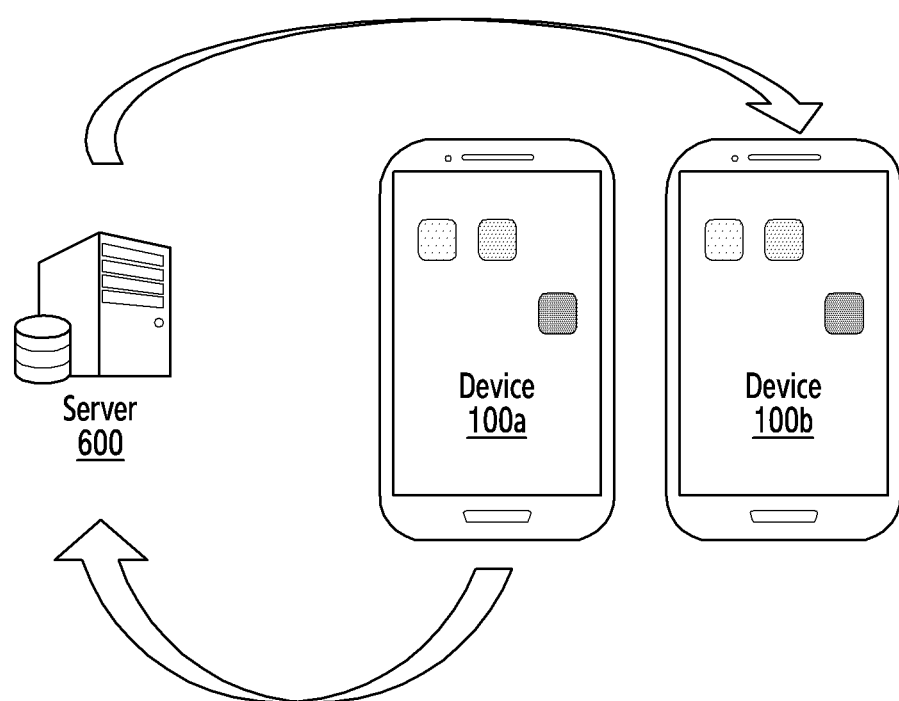
FIG. 6 is an example for transferring content across electronic devices using the fingerprint on display, according to an embodiment.

FIG. 6 is an example for transferring content across electronic devices using the fingerprint on display, according to an embodiment. FIG. 6 illustrates an example of copying content in a first electronic device 100a and transferring the content to a second electronic device 100b. As illustrated in the FIG. 6, the user can select the graphical objects, which can be application icons, labels, text, buttons, content or the like. The user selects various graphical objects by assigning the fingerprints for each of the selected object. The selected objects copied in the first electronic device 100 are extracted at the server. It should be noted that the server shown in the maintains a mapping of the fingerprints and the associated graphical objects.

Further, when the user taps on the second electronic device 100b using the fingerprints, the server 600 transfers the selected graphical objects to the second electronic device as shown in the FIG. 6. Thus, with the proposed method, by assigning the fingerprints to the graphical objects, the graphical objects can be copied in the first electronic device 100a and are transferred to the second electronic device 100b.

Figure 7:
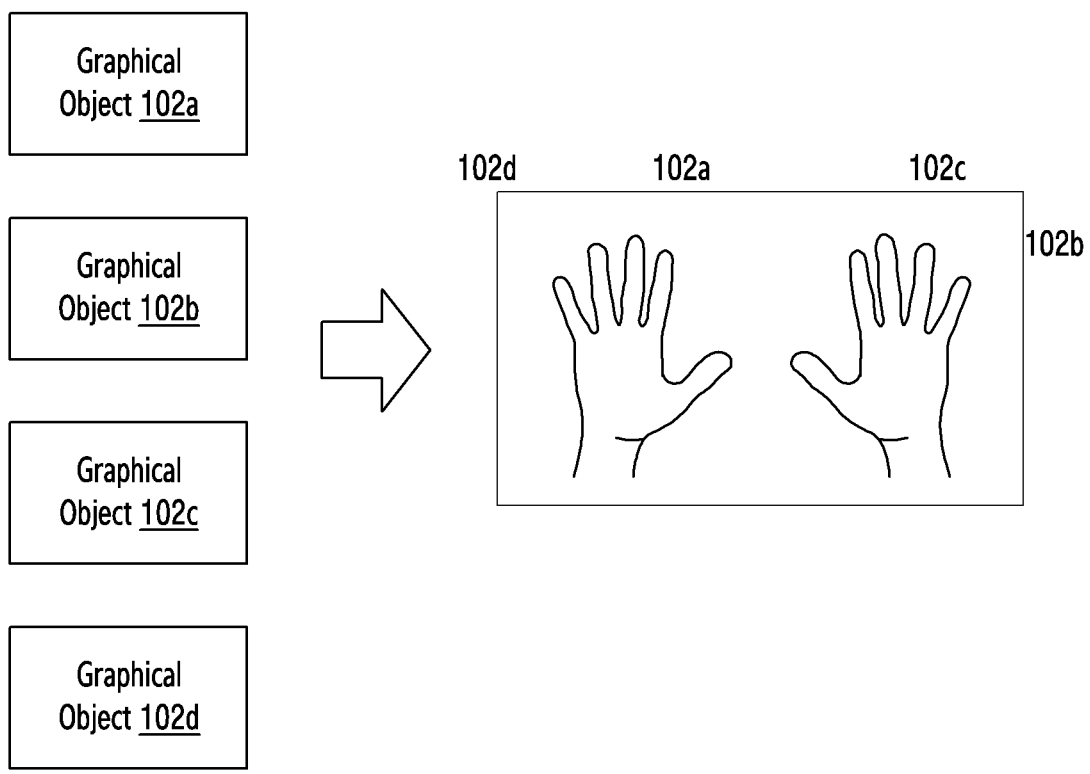
FIG. 7 is an example for assigning the fingerprints to the graphical objects, according to an embodiment.
Figure 9A:
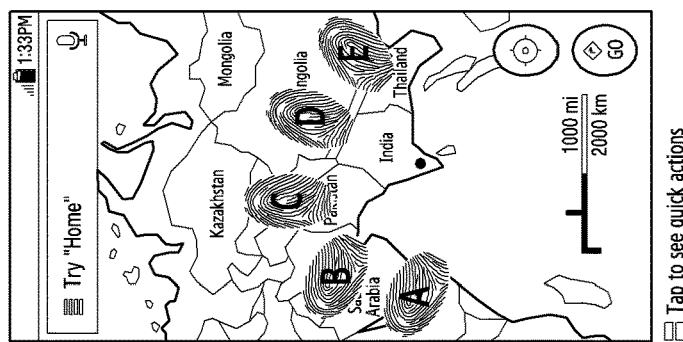
FIGS. 9A, 9B, 9C, 9D, and 9E illustrate examples of performing a zoom operation on content using various fingerprints of the user, according to an embodiment.
Figure 9B:
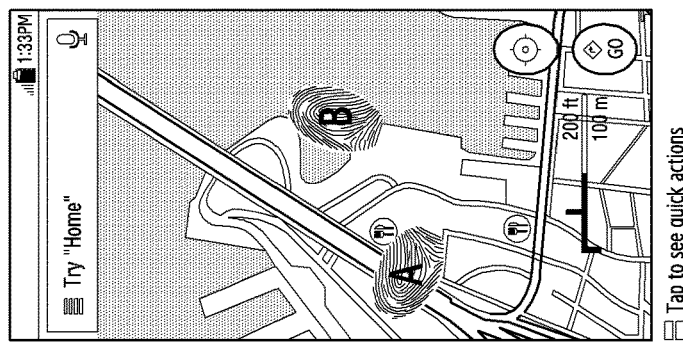
Figure 9C:
Figure 9D:
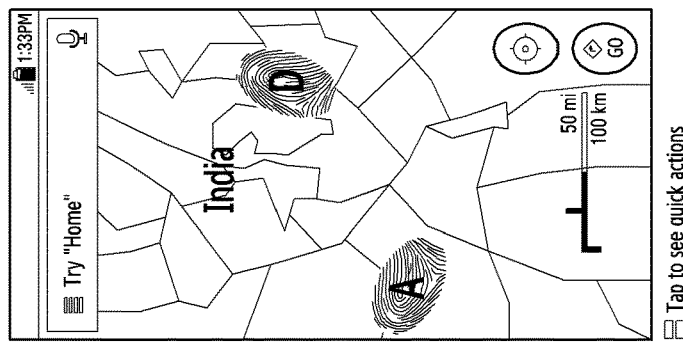
Figure 9E:
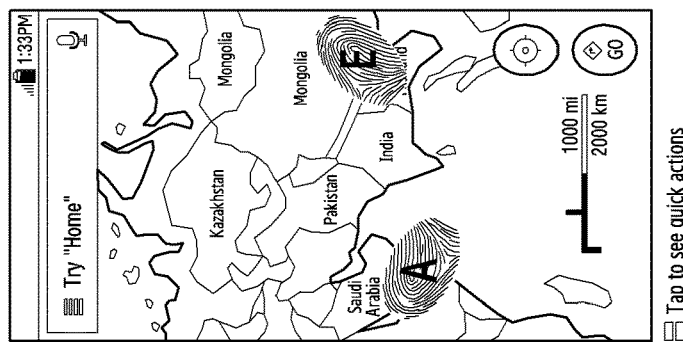

FIG. 7 is an example for assigning the graphical objects for the fingerprints, according to an embodiment. The electronic device 100 provides various recommendations to the user for assigning fingerprints to the graphical objects. For example, the index finger is commonly used by the user for interacting with the electronic device 100. Thus, the electronic device 100 provides recommendations to the user for registering the fingerprint of the index finger to a graphical object (such as a human face) that appears most frequently in a multimedia content. In another example, the electronic device 100 provides recommendations to the user for registering the fingerprint of the index finger to a graphical object (such as a human face) that appears for a maximum duration in the multimedia content. Thus, the electronic device 100 provides various recommendation to the for registering the fingerprint(s) based on various parameters including but not limited to on-screen focus time, on-screen location of the graphical object in the multimedia content.

In some embodiments, the electronic device 100 provides various recommendations to the user for registering the fingerprint(s) based on usage pattern of the graphical objects.

As illustrated in the FIG. 7, the electronic device generates recommendations for the graphical objects 102a-102d for index finger, little finger and thumb finger respectively for the user to access or to interact with the graphical objects.

FIGS. 8A-8D are examples in which various actions are performed on the multimedia content using the fingerprint on display of the electronic device, according to an embodiment. FIGS. 8A-8D illustrate examples of content retrieval and content view management in the electronic device using the fingerprints.

As illustrated in the FIG. 8A, the user taps on the screen using a registered fingerprint to skip music related content or content related to a specific character associated with the registered fingerprint.

As illustrated in the FIG. 8B, the content of a video to be displayed is modified to show only selected content. The selected content is shown based on the fingerprint detected on the display screen of the electronic device 100.

As illustrated in the FIG. 8C, if the user intends to only display only photographs or video content without revealing identities of people in the video or image, the user can tap with the fingerprint on a selected photograph to enable blurring of the face of the people in the photograph.

As illustrated in the FIG. 8D, the user can perform zoom on a selected face in the photograph by applying the fingerprint on the selected face. Although, the FIGS. 8A-8D show limited examples of performing actions in the electronic device using the fingerprints, it should be noted that the user can perform various actions using the fingerprints assigned to the graphical objects.

FIGS. 9A-9E are examples of performing a zoom operation on content using various fingerprints of the user, according to an embodiment. The user assigns various fingerprints A to E on a navigational map application as shown in the FIG. 9A. Various zoom levels can be achieved using the fingerprints A to E. As illustrated in the FIG. 9B, when the fingerprints A and B are used, a first zoom level is achieved. As illustrated in the FIG. 9C, when the fingerprints A and C are used, a second zoom level is achieved. As illustrated in the FIG. 9D, when the fingerprints A and D are used, a third zoom level is achieved. Similarly, when the fingerprints A and E are used, the highest zoom level is achieved. Thus, with the proposed method, the user can perform zooming at various level by assigning the fingerprints on the navigational map application.

Figure 10A:
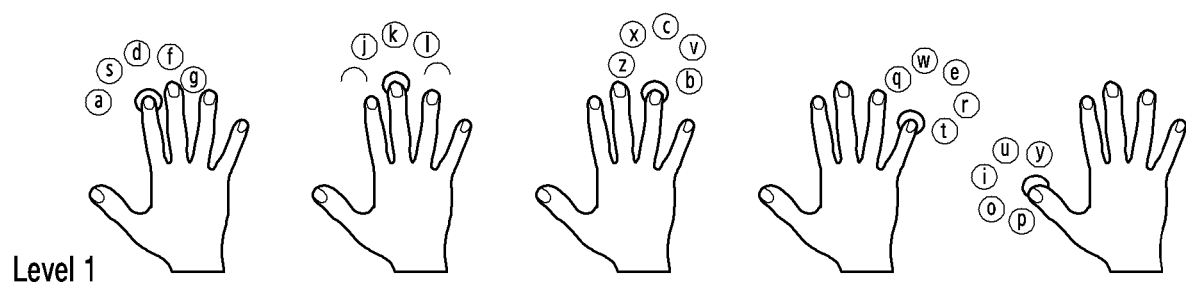
FIGS. 10A and 10B are an example of selecting characters using fingerprints, according to an embodiment.
Figure 10B:
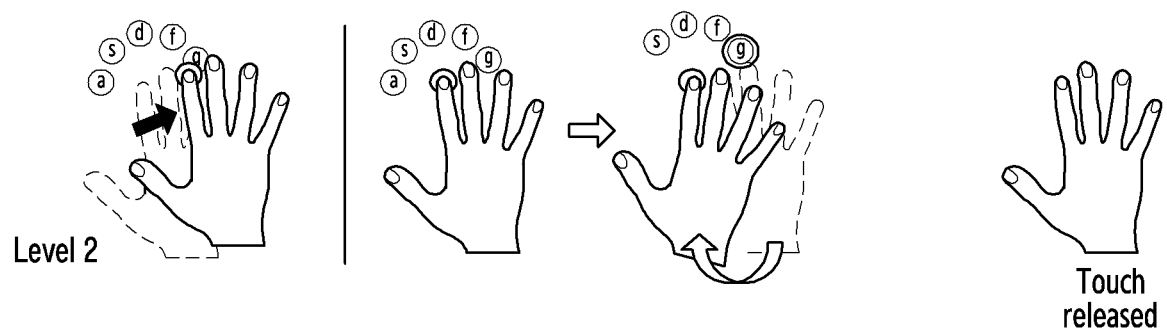

FIGS. 10A and 10B are an example of selecting characters using fingerprints, according to an embodiment. As illustrated in the FIG. 10A, various characters can be selected or inputted using the fingerprints assigned to those characters. For example, the characters A, S, D, F and G are assigned to the index figure and similarly the other characters are assigned to other fingers at Level 1 as shown in the FIG. 10A. Further, referring to FIG. 10B, at Level 2, when the user taps the index finger on the display screen, the assigned characters A, S, D, F and G are displayed. The user can select the characters using any of the fingers. Further, when the user releases the tap on the display screen, the characters disappear automatically.

Figure 11:
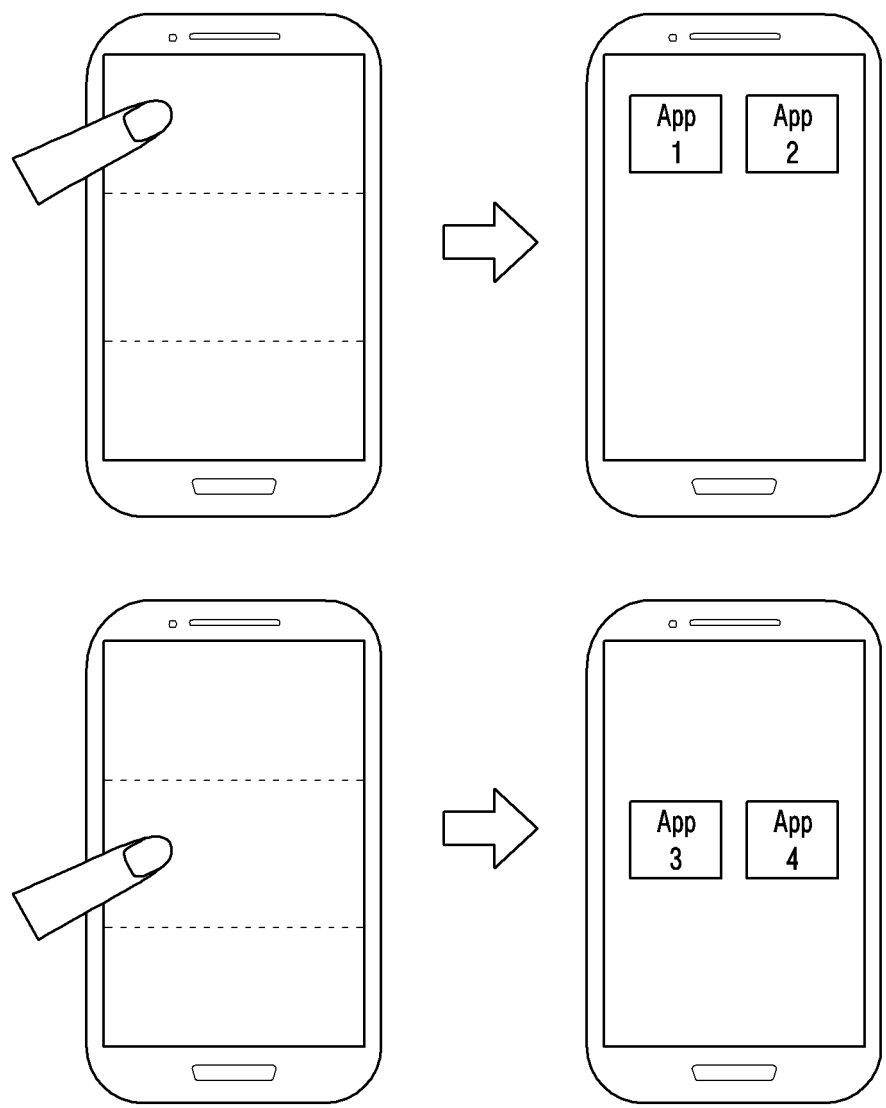
FIG. 11 is an example in which the electronic device displays applications on a portion of the display screen using the fingerprints, according to an embodiment.

FIG. 11 is an example in which the electronic device displays applications on a portion of the display screen using the fingerprints, according to an embodiment. As illustrated in the FIG. 11, the various applications on a portion of the display screen can be registered with fingerprint. As shown in FIG. 11, consider that the user has registered a fingerprint on the top portion of display screen with App 1 and App 2. When the user taps on the top portion of display screen using the fingerprint, App 1 and App 2 are displayed. Further, if the user registers a fingerprint on a mid portion of display screen with App 3 and App 4 and when the user taps on the mid portion of display screen, App 3 and App 4 are displayed.

Figure 12A:
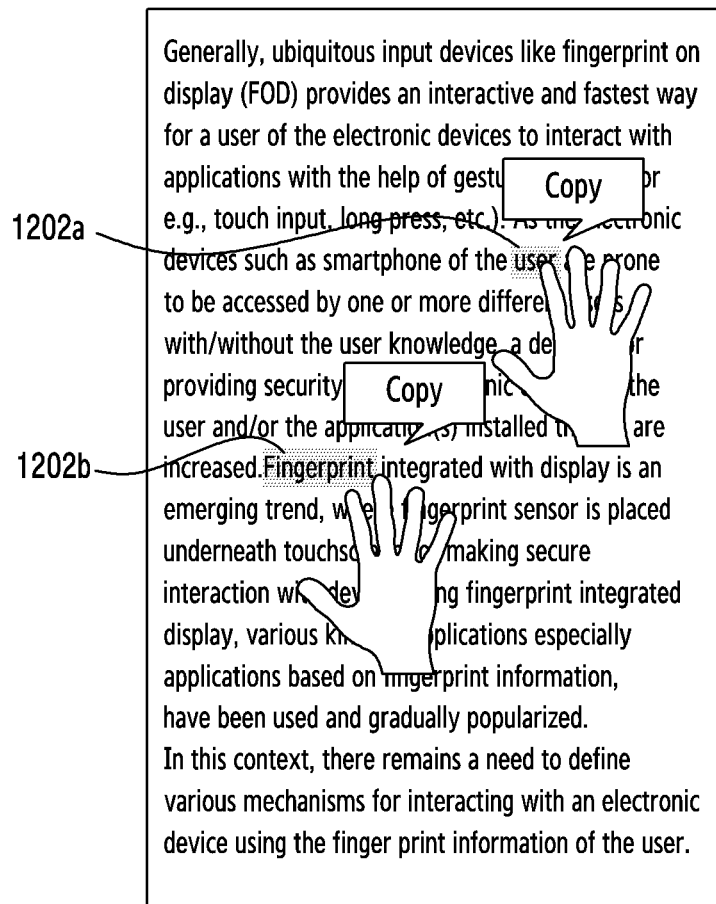
FIGS. 12A and 12B are an example of copying and pasting contents using fingerprints, according to an embodiment.
Figure 12B:
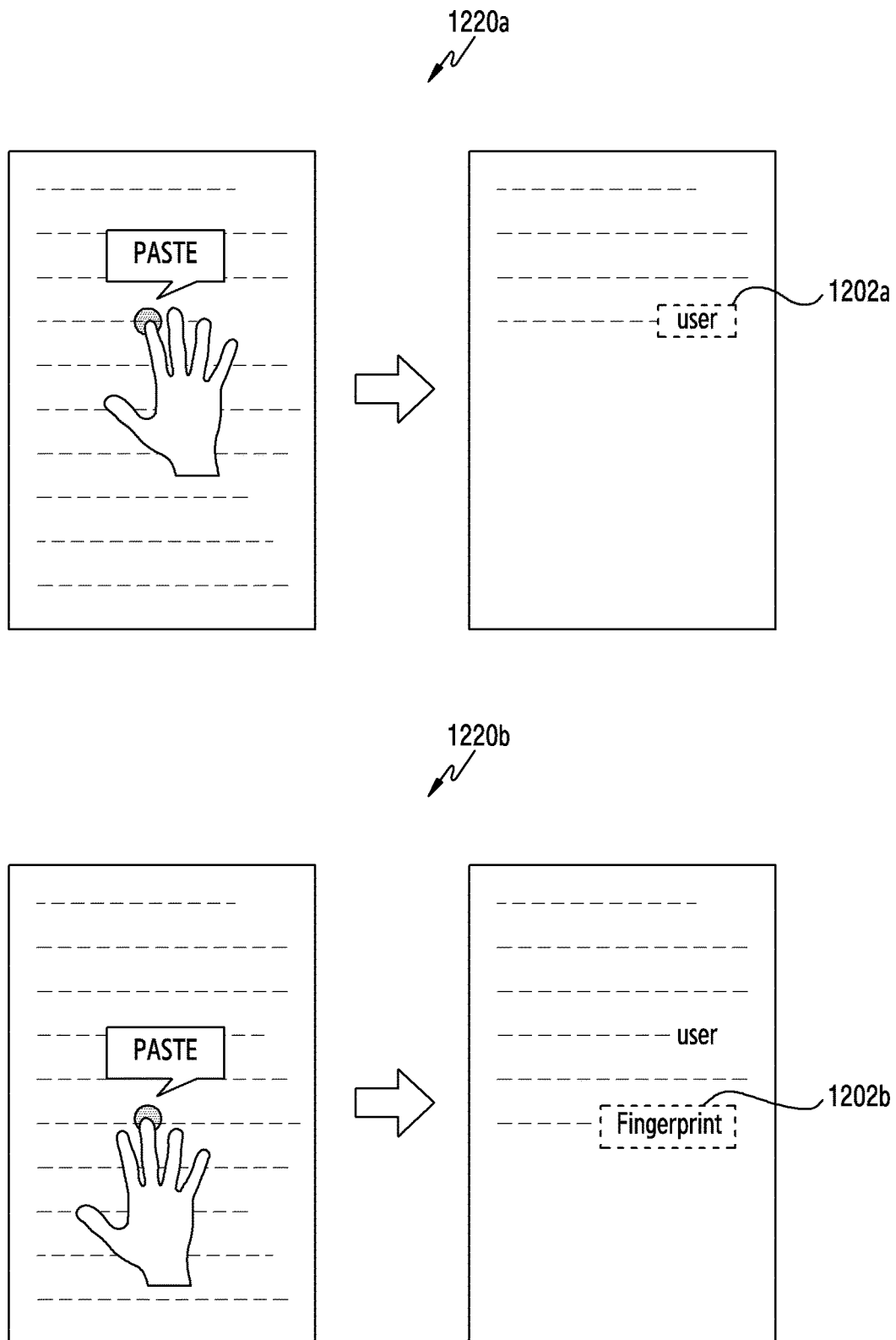

FIGS. 12A and 12B illustrate an example of copying and pasting contents using fingerprints, according to an embodiment. Referring to FIG. 12A, a user can copy text contents 1202a and 1202b into a clipboard by using a copy command.

Herein, the user uses an index finger when copying the first text content 1202*a*, and uses a middle finger when copying the second text content 1202*b*. According to an embodiment, the electronic device 100 stores text contents 1202*a* and 1202*b* with mapping information. The mapping information indicates at least one fingerprint mapped to each of text contents 1202*a* and 1202*b*. Accordingly, as illustrated in FIG. 12B, when the user pastes a text content by using a paste command, the pasted text content depends on which finger is touched on the display screen 160. For example, as in example 1220*a*, if the user uses the index finger, the electronic device 100 display the first text content 1202*a* based on the mapping information. Otherwise, if the user uses the middle finger, the electronic device 100 adds the second text content 1202*b* based on the mapping information.

In an embodiment described with FIGS. 12A and 12B, copying and pasting operations are exemplified. In various embodiments, aforementioned embodiment is applied to different operation (e.g., moving operation). Further, aforementioned embodiment is applied to different type of contents (e.g., file, icon and so on).

Figure 13:
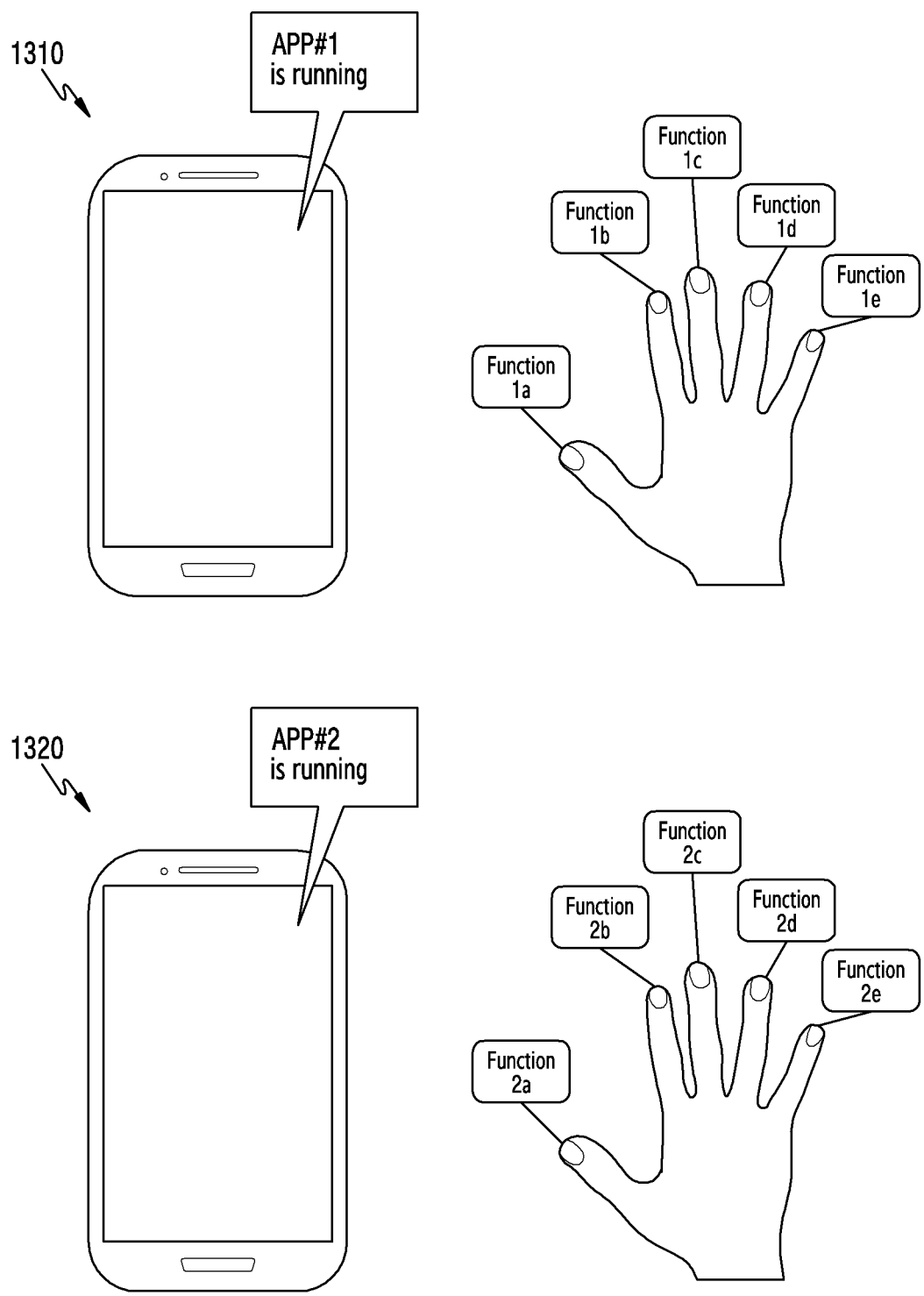
FIG. 13 is an example of assigning functions using fingerprints, according to an embodiment.

FIG. 13 is an example of assigning functions using fingerprints, according to an embodiment. Referring to FIG. 13, functions related to an application are assigned to each of fingers. In an embodiment, a set of functions assigned to the fingers can changed based on which application is running in the electronic device 100. As illustrated in FIG. 13, functions 1*a*-1*e* are assigned to the fingers while an application #1 is running, and functions 2*a*-2*e* are assigned to the fingers while an application #2 is running. Hence, although the user inputs a command by using same finger, a function to be performed depends on an application being running. For example, the index finger can be used to command a function to load a file while the application #1 is running, and the index finger can be used to command to capture a screen while the application #2 is running. To do so, the electronic device 100 stores mapping information that defines mapping between a set of function and an application with each fingerprint. Further, the electronic device 100 can perform a procedure for assigning functions to the fingers to generate the mapping information.

The embodiments disclosed herein can be implemented through at least one software program running on at least one hardware device and performing network management functions to control the elements. The elements shown in FIGS. 1-14 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by an electronic device, the method comprising:

detecting at least one fingerprint from at least one touch input on a display screen;
   identifying an object corresponding to the at least one fingerprint;
   determining a set of functions related to an application executed by the electronic device among a plurality of applications, wherein each function is assigned to a different fingerprint within the application;
   determining at least one action of a function to be performed based on the at least one fingerprint, the application, and the object; and
   performing the at least one action,
   wherein the at least one action of the function assigned to the at least one fingerprint of a first running application is different than an action of the function assigned to the same fingerprint of a second running application.

2. The method of claim 1, wherein the at least one action comprises a copy command and a paste command, and
   wherein the performing comprises:
   in response to the copy command, storing the object, and
   in response to the paste command, displaying the object.

3. The method of claim 1, wherein the at least one action comprises transferring the object to another electronic device.

4. The method of claim 1, wherein the object comprises one or more graphical objects.

5. The method of claim 1, wherein the at least one action comprises modifying one or more parameters of the object.

6. The method of claim 1, wherein the at least one action comprises displaying a virtual keypad comprising a set of keys corresponding to the at least one fingerprint.

7. The method of claim 1, wherein the at least one action comprises changing a zoom level.

8. The method of claim 1, further comprising:
   providing one or more recommendations for assigning the at least one fingerprint.

9. An electronic device comprising:
   a display screen;
   at least one touch sensor; and
   a processor coupled to the display screen and the at least one touch sensor and configured to:
   detect at least one fingerprint from at least one touch input on the display screen;
   identify an object corresponding to the at least one fingerprint;
   determine a set of functions related to an application executed by the electronic device among a plurality of applications, wherein each function is assigned to a different fingerprint within the application;
   determine at least one action of a function to be performed based on the at least one fingerprint, the application, and the object; and
   perform the at least one action,
   wherein the at least one action of the function assigned to the at least one fingerprint of a first running application is different than an action of the function assigned to the same fingerprint of a second running application.

10. The electronic device of claim 9, wherein the at least one action comprises a copy command and a paste command, and
    wherein the processor is further configured to:
    in response to the copy command, store the object, and
    in response to the paste command, display the object.

11. The electronic device of claim 9, the at least one action comprises transferring the object to another electronic device.

12. The electronic device of claim 9, wherein the object comprises one or more graphical objects.

13. The electronic device of claim 9, wherein the at least one action comprises modifying one or more parameters of the object.

14. The electronic device of claim 9, wherein the at least one action comprises displaying a virtual keypad comprising a set of keys corresponding to the at least one fingerprint.

15. The electronic device of claim 9, wherein the at least one action comprises changing a zoom level.

16. The electronic device of claim 9, the processor is configured to:
   provide one or more recommendations for assigning the at least one fingerprint.

* * * * *